United States Patent
Kimoto

(10) Patent No.: US 6,853,753 B2
(45) Date of Patent: Feb. 8, 2005

(54) IMAGE SEQUENCE CODING METHOD

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 632 days.

(21) Appl. No.: 09/968,975

(22) Filed: Oct. 2, 2001

(65) Prior Publication Data
US 2002/0039450 A1 Apr. 4, 2002

(30) Foreign Application Priority Data
Oct. 2, 2000 (JP) ........................................ 2000-302444

(51) Int. Cl.[7] ................................................ G06K 9/36
(52) U.S. Cl. ....................... 382/236; 382/232; 382/233; 382/238
(58) Field of Search ................................ 382/232, 233, 382/236, 238; 375/240.15, 240.13, 240.16, 240.28; 348/699

(56) References Cited

U.S. PATENT DOCUMENTS 5,175,618 A * 12/1992 Ueda et al. ............ 375/240.13
6,148,028 A * 11/2000 Kikuchi et al. ............. 375/240
6,611,558 B1 * 8/2003 Yokoyama ............. 375/240.15

FOREIGN PATENT DOCUMENTS

JP 408275176 * 10/1996 ............ H04N/7/32
JP 2000-165881 6/2000 ............ H04N/7/32

OTHER PUBLICATIONS

Chan, "The Performance of DPCM Operating on Lossy Channels with Memory", IEEE Transactions on Communications, vol. 43, No. 2, 3, 4, Feb., Mar., Apr. 1995, pp. 1686–1696.*

* cited by examiner

Primary Examiner—Anh Hong Do
(74) Attorney, Agent, or Firm—Scully, Scott, Murphy & Presser

(57) ABSTRACT

Image quality deterioration degree estimation (step S2) is made on the basis of quantization error between decoded image of coded data and input image and estimated value of image quality deterioration in the case of the missing of the coded data due to occurrence of transmission error with a certain probability. All the blocks in the frame are coded by determining block coding mode to be either inter-frame predictive coding or intra-frame coding on the basis of the image quality deterioration degrees of all the blocks in the frame. By intra-frame coding the image on the basis of the expected value of the image quality deterioration, it is possible to suppress deterioration of the decoded image in the case of the missing of some of the coded data due to error occurrence. With collective dealing of the quantization error and the deterioration error, the number of blocks with the refreshing set therefor are not greatly increased, and it is also possible to suppress image quality deterioration of decoded image in the case of no error occurrence.

24 Claims, 9 Drawing Sheets

REFERENCE FLAME      PRESENT FLAME

IMAGE SEQUENCE CODING METHOD

BACKGROUND OF THE INVENTION

This application claims benefit of Japanese Patent Application No. 2000-302444 filed on Oct. 2, 2000, the contents of which are incorporated by the reference.

The present invention relates to image coding methods and, more particularly, to methods of suppressing the deterioration of image data transmitted on low quality communication lines.

In a prior art image sequence coding method, in which intra-frame coding (or intra-frame coding) and inter-frame predictive coding are selectively used for each block as unit of coding, for suppressing image quality deterioration due to errors occurring in the transmission of coded image sequence, it is in practice to make forced block intra-frame coding aside from coding mode selection on the basis of the coding efficiency. Inter-frame predictive coding of deteriorated quality images results in extreme deterioration of the subjective image quality due to propagation of the deterioration over a plurality of frames. By forcedly intra-frame coding images, on the other hand, the propagation of the deterioration can be suppressed to improve the resistance against the image quality deterioration. The degree of deterioration due to occurrence of errors in individual areas of image, depends on the pixel value distribution. Thus, the resistance against errors can be effectively improved without great sacrifice in the coding efficiency by preferentially making forced intra-frame coding pronouncedly deteriorated image quality blocks.

FIG. 8 is a flow chart showing the processing flow of an image sequence coding method adopting the above prior art. This prior art image sequence coding method will now be described with reference to FIG. 8.

When coding input image for each frame, the image quality deterioration degree representing the degree of image quality deterioration in the case of assuming missing of coded data due to an error, is first computed for each block as unit of coding (step S20). Then, the degree of preference for the forced intra-frame coding is computed on the basis of the image quality deterioration degree (step S21). Then, blocks to be intra-frame coded are determined on the basis of the forced intra-frame coding preference degree. Aside from this, a coding mode taking the coding efficiency into considerations is selected (step S22). The blocks in the frame are then fully subjected to the intra-frame coding or the inter-frame predictive coding in dependence on the coding mode selected in the above way (step S23).

FIG. 9 is a block diagram showing an image sequence coding system show in Japanese Patent Laid-Open No. 2000-165881. The above prior art image sequence coding method will further be described with reference to FIG. 9.

When input image 101 is inputted, as a pre-processing, an inter-frame motion sensor 3 detects motions from a reference image stored in a frame memory 2, and feeds corresponding motion vectors to a motion compensation inter-frame predictor 20. At the same time, the sensor 3 feeds the sum of absolute differences between reference image and input image of the blocks obtained at the time of the motion detection to a deterioration error computer 4.

The deteriorating error computer 4 computes a deterioration error between deteriorated image and input image when it is assumed the occurrence of a transmission error in coded data.

FIG. 10 is a view for describing error at the time of deterioration. In the absence of any error, a decoder uses pixel values of blocks in the reference image at a motion compensation position thereof. On the other hand, when missing of data occurs due to error occurrence, the missing pixel values are extrapolated by directly copying the pixel values of the like position blocks in the reference image. The degree of image quality deterioration at this time, is expressed as the difference between the like position pixel values in the reference image and present frame pixel values.

Referring again to FIG. 9, a counter 21 and a data missing probability estimator 22 estimate the probability of occurrence of data missing due to an error for each block from the preceding frame coded data.

FIG. 11 is a view for describing error occurrence position and data missing probability. The coded data as shown is in the form, in which sync. codes are inserted between coded data each comprising a plurality of blocks. When the decoder detects an error, it discards data from that position up to the next sync. signal, and decodes data afresh from that position. For this reason, while errors occur randomly at the transmission time, the coded data is subject to discarding with the higher probability the greater the distance from the preceding sync. signal.

Returning again to FIG. 9, a forced intra-frame coding preference degree computer 30 computes the preference degree of making the forced intra-frame coding by threshold checking the deterioration error of the present frame and the data missing probability of the present frame. A mode controller 32 determines blocks to be subject to forced intra-frame coding from a forced intra-frame coding map 31 with forced intra-frame coding preference degree data stored therein. A switch 13 switchingly selects either the intra-frame coding or the inter-frame predictive coding as block coding mode. In the coding mode thus selected, the input image or predictive error signal is subjected to conversion coding and quantization and then converted to coded data for each block. In this method, with the blocks which are the greater in the deterioration error and the data missing probability, the degree of deterioration in the event of error occurrence is the greater. Such blocks are thus preferentially subjected to the intra-frame coding.

In the above prior art method, the forced intra-frame coding is made independently of the intra-frame coding/inter-frame predictive coding taking the coding efficiency into considerations. Therefore, depending on the setting of the threshold as reference of the forced intra-frame coding selection, the intra-frame coding may be selected for many blocks to result in undesired coding efficiency reduction.

In addition, in the prior art method the actual image quality deterioration in the event of the transmission error occurrence is not sufficiently reflected. Particularly, the effect of propagation of the deterioration generated in past frames by the inter-frame predictive coding is not taken into considerations.

SUMMARY OF THE INVENTION

An object of the present invention is to provide an image sequence coding method, which can preclude the drawbacks discussed above in the prior art.

A more specific object of the present invention is to provide an image sequence coding method, in which image signal is preliminarily coded for reducing image quality deterioration due to errors when communicating compression coded image signal in low quality transmission line environments.

According to an aspect of the present invention, there is provided-an image sequence coding method for coding input image to coded data by adaptively selectively using either intra-frame coding or inter-frame predictive coding in units of blocks as coding units, comprising: an error computing step of computing, in frame-by-frame coding of the input image, the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; a block coding mode control step of block-by-block controlling the coding mode to either the intra-frame coding or the inter-frame predictive coding according to the image quality deterioration degree; and a frame coding step of coding all the blocks in the pertinent frame in the controlled coding modes.

According to another aspect of the present invention, there is provided an image sequence coding method for coding input image to coded data by adaptively selectively using either intra-frame coding or inter-frame predictive coding in units of blocks as coding units, comprising: a coding mode initializing step of presetting, in the frame-by-frame coding of the input image, the coding mode to the inter-frame predictive coding for all the blocks in the frame; a block coding step of executing block-by-block coding according to the preset coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree; wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought.

According to other aspect of the present invention, there is provided an image sequence coding method for coding input image to coded data by adaptively selectively using either intra-frame coding or inter-frame predictive coding in units of blocks as coding units, comprising: a coding mode initializing step of presetting, in the frame-by-frame coding of the input image, the coding mode to the inter-frame predictive coding for all the blocks in the frame; a block coding step of executing block-by-block coding according to the preset coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree; wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image and the image quality deterioration degree estimated in the image quality deterioration degree estimating step, being expressed as the linear sum of the expected value of the degree of image quality deterioration due to transmission error in the coded data and the quantization error.

In the quantization error computing step the quantization error is estimated from quantization steps obtained for each block in the block coding step. In the deterioration error computing step the deterioration error is estimated by using the decoded image of the preceding frame as deteriorated image.

According to still other aspect of the present invention, there is provided an image sequence coding method for coding input image to coded data by adaptively selectively using either intra-frame coding or inter-frame predictive coding in units of blocks as coding units, comprising: a coding mode initializing step of presetting, in the frame-by-frame coding of the input image, the coding mode to the inter-frame predictive coding for all the blocks in the frame; a block coding step of executing block-by-block coding according to the preset coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree; wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, the image quality deterioration degree estimated in the image quality deterioration degree estimating step, being expressed as the linear sum of the expected value of the degree of image quality deterioration due to transmission error in the coded data and the quantization error, the image quality deterioration degree estimating step including a data missing probability estimating step of block-by-block counting the distance from the position of a sync. code inserted in the coded data and estimating the data missing probability, i.e., the probability of missing, during transmission, of the coded data of the block under attention, and the expected value of deterioration in the case when the block under attention is a intra-frame coded block being computed as the product of the deterioration error and the data missing probability, and the expected value of deterioration in the case when the block under attention is an inter-frame predictive coded block being made to the sum of the product of the deterioration error and the data missing probability and the deterioration propagation term as expected value of deterioration of an area of the reference frame referred to in a motion compensation processing in the inter-frame predictive coding.

The deterioration propagation term is computed as a weighted mean of the expected values of deterioration of a plurality of blocks contained in the area of the reference frame referred to as in the motion compensation processing. In the image quality deterioration degree estimating step, the expected value of deterioration in the case when the block under attention is an inter-frame predictive coded block, is set to the sum of the product of the deterioration error and the data missing probability and a value obtained by multiplying a predetermined proportionality constant by the deterioration propagation term. In the block coding mode control step, the image quality deterioration degrees of all the blocks in the frame are compared to a predetermined threshold value, and the intra-frame coding is selected as the coding mode of blocks having image quality deterioration degrees greater than the threshold value. In the block coding mode control step, a predetermined number of blocks among the blocks of the image frame are selected in the order of greater image quality deterioration degrees, and the intra-frame coding is selected as the coding mode of the selected blocks. The block coding mode control step includes a refreshing block candidate selecting step of selecting given blocks with the inter-frame predictive coding set therefor among all the blocks in the image frame and tentatively setting the intra-frame coding as the coding mode of the selected blocks and a block coding mode judging step, in which the image quality deterioration degrees of the blocks selected in the refreshing block candidate selecting step are tentatively stored and, after the execution of the block coding step, the error computing step and the image quality deterioration estimating step for all the blocks in the image frame again, when it is found that the updated image quality deterioration degree of a block under attention is reduced compared to the tentatively stored image quality deterioration degree, the intra-frame coding is selected as the coding mode of the block under attention, and the refreshing block candidate selecting step is executed afresh, when it is found that the image quality deterioration degree of the block is increased compared to the tentatively stored image quality deterioration degree, the inter-frame predictive coding is set again as the coding mode of the block under attention, and the refreshing block candidate selecting step is executed afresh, and when it is found that the image quality deterioration degrees of all the blocks selectable in the refreshing block candidate selecting step are increased by selecting the intra-frame coding as the coding mode, an end is brought.

According to further aspect of the present invention, there is provided an image sequence coding method for coding input image to coded data by adaptively selectively using either intra-frame coding or inter-frame predictive coding in units of blocks as coding units, comprising: a coding mode initializing step of presetting, for frame-by-frame coding of the input image, the inter-frame predictive coding for all the blocks in the image frame as the coding mode, which is preset block by block to either the intra-frame coding or the inter-frame predictive coding; a block code amount estimating step of estimating the code amount of each block according to the coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; a block coding step of executing block-by-block coding according to the coding mode; herein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time.

According to still further aspect of the present invention, there is provided an image sequence coding method for coding input image to coded data by adaptively selectively using either intra-frame coding or inter-frame predictive coding in units of blocks as coding units, comprising: a coding mode initializing step of presetting, for frame-by-frame coding of the input image, the inter-frame predictive coding for all the blocks in the image frame as the coding mode, which is preset block by block to either the intra-frame coding or the inter-frame predictive coding; a block code amount estimating step of estimating the code amount of each block according to the coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; a block coding step of executing block-by-block coding according to the coding mode; wherein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, and the image quality deterioration degree estimated in the image quality deterioration degree estimating step, being expressed as the linear sum of the expected value of the degree of image quality deterioration due to transmission error in the coded data and the quantization error.

The block code amount estimating step includes a code amount control step of controlling the quantization steps of each block such that the sum of the code quantities of all the blocks in the image frame is settled in the neighborhood of a predetermined desired code amount, and the quantization error computing step estimates the quantization error on the basis of the quantization steps of each block obtained in the block code amount estimating step. In the deterioration error computing step the deterioration error is estimated by using the decoded image of the preceding frame as deteriorated image.

According to other aspect of the present invention, there is provided an image sequence coding method for coding input image to coded data by adaptively selectively using either intra-frame coding or inter-frame predictive coding in units of blocks as coding units, comprising: a coding mode initializing step of presetting, for frame-by-frame coding of the input image, the inter-frame predictive coding for all the blocks in the image frame as the coding mode, which is preset block by block to either the intra-frame coding or the inter-frame predictive coding; a block code amount estimating step of estimating the code amount of each block according to the coding mode; an error computing step of block-by-block computing the error between decoded image obtained by decoding the coded data and the input image and the error between deteriorated image in the case of assuming the missing of data and the input image; an image quality deterioration degree estimating step of block-by-block estimating the image quality deterioration degree representing the image quality deterioration degree in the case of occurrence of error in the coded data with a certain probability on the basis of both the errors; a block coding step of executing block-by-block coding according to the coding mode; wherein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, and the image quality deterioration degree estimated in the image quality deterioration degree estimating step, being expressed as the linear sum of the expected value of the degree of image quality deterioration due to transmission error in the coded data and the quantization error; and the image quality deterioration degree estimating step including a sync. code position determining step for determining the position sync. code inserted in the coded data on the basis of the predicted code amount of each block obtained in the block code amount estimating step, and a data missing probability estimating step of counting the distance from the sync. code for each block and estimating the probability of the missing of the coded data of the block under attention during transmission from the count thus obtained, the expected value of deterioration in the case when the block under attention is a intra-frame coded block being computed as the product of the deterioration error and the data missing probability, and the expected value of deterioration in the case when the block under attention is an inter-frame predictive coded block being made to the sum of the product of the deterioration error and the data missing probability and the deterioration propagation term as expected value of deterioration of an area of the reference frame referred to in a motion compensation processing in the inter-frame predictive coding.

The deterioration propagation term is computed as a weighted mean of the expected values of deterioration of a plurality of blocks contained in the area of the reference frame referred to as in the motion compensation processing. In the image quality deterioration degree estimating step, the expected value of deterioration in the case when the block under attention is an inter-frame predictive coded block, is set to the sum of the product of the deterioration error and the data missing probability and a value obtained by multiplying a predetermined proportionality constant by the deterioration propagation term. In the block coding mode control step, the image quality deterioration degrees of all the blocks in the frame are compared to a predetermined threshold value, and the intra-frame coding is selected as the coding mode of blocks having image quality deterioration degrees greater than the threshold value. In the block coding mode control step, a predetermined number of blocks among the blocks of the image frame are selected in the order of greater image quality deterioration degrees, and the intra-frame coding is selected as the coding mode of the selected blocks. The block coding mode control step includes: a refreshing block candidate selecting a step of selecting given blocks with the inter-frame predictive coding set therefor among all the blocks in the image frame and tentatively setting the intra-frame coding as the coding mode of the selected blocks and a block coding mode judging step, in which the image quality deterioration degrees of the blocks selected in the refreshing block candidate selecting step are tentatively stored and, after the execution of the block coding step, the error computing step and the image quality deterioration estimating step for all the blocks in the image frame again, when it is found that the updated image quality deterioration degree of a block under attention is reduced compared to the tentatively stored image quality deterioration degree, the intra-frame coding is selected as the coding mode of the block under attention, and the refreshing block candidate selecting step is executed afresh, when it is found that the image quality deterioration degree of the block is increased compared to the tentatively stored image quality deterioration degree, the inter-frame predictive coding is set again as the coding mode of the block under attention, and the refreshing block candidate selecting step is executed afresh, and when it is found that the image quality deterioration degrees of all the blocks selectable in the refreshing block candidate selecting step are increased by selecting the intra-frame coding as the coding mode, an end is brought.

In the block code amount estimating step, when the coding mode of the block under attention is the intra-frame coding, the input signal is subjected to transform coding and quantization, entropy is computed with respect to the codes after the quantization; and when the coding mode of the block under attention is the inter-frame predictive coding, the code amount estimation is done by transform coding and quantizing the predicted error signal and computing entropy with respect to the codes after the quantization. The block code amount estimating step is executed such that: when the coding mode of the block under attention is the intra-frame coding, the code amount estimation is done with respect to the input signal on the basis of the variation thereof; and when the coding mode of the block under attention is the inter-frame predictive coding, the code amount estimation is done with respect to the predicted error signal on the basis of the variation thereof. In the block code amount estimating step, when the coding mode of the block under attention is the inter-frame predictive coding, the code amount estimation is done on the basis of the error between predicted image after motion compensation obtained in the inter-frame motion detection and the input image.

Other objects and features will be clarified from the following description with reference to attached drawings.

PREFERRED EMBODIMENTS OF THE INVENTION

Preferred embodiments of the present invention will now be described with reference to the drawings.

Figure 1:
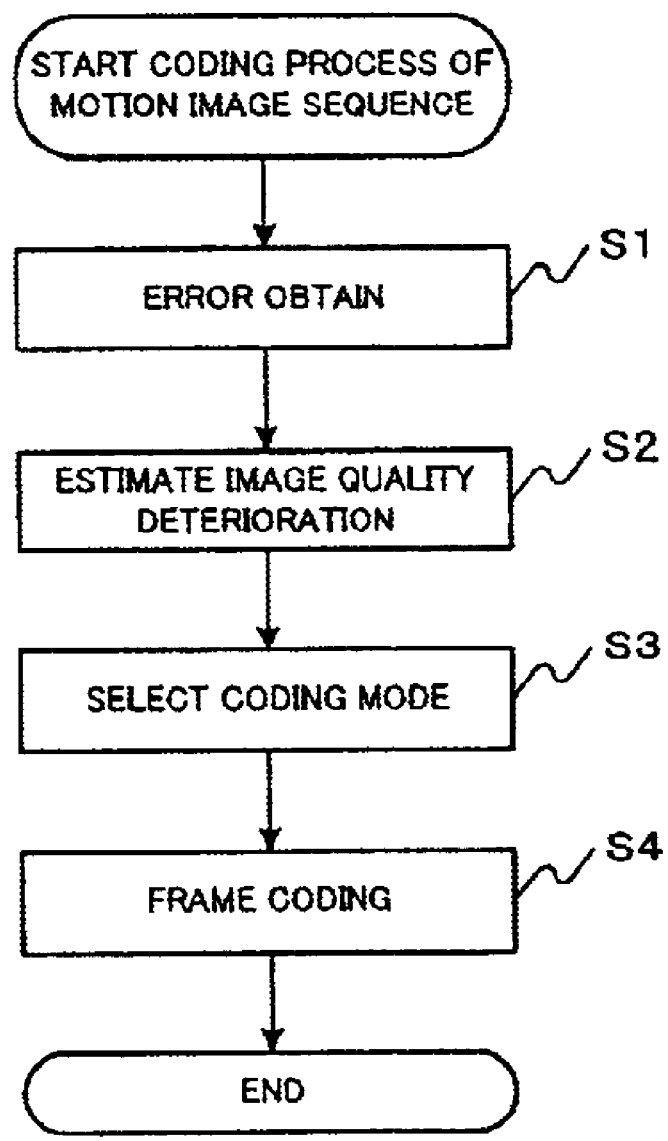
FIG. 1 is a flow chart showing the flow of processing, according to the present invention.

FIG. 1 is a flow chart showing the flow of processing according to the present invention.

Referring to FIG. 1, at the instant of the start of the image frame coding, the quantization error as the error decoded image obtained by decoding coded data and input image and the deterioration error as the error between deteriorated error in the case of assuming the data occurrence in the coded data in input image are computed (step S1), and the degree of image quality deterioration expressed as the linear sum of an expected error of the image quality deterioration in the case of occurrence of an error in a certain probability and a quantization error are estimated (step S2). Then, the coding mode of blocks is selected such as to minimize the sum of the degrees of image deterioration of blocks (step S3). The blocks in the frame are then coded on the basis of the decoding mode (step S4).

In the above processing, a plurality of mounting systems are present as error estimation or coding mode control system. The present invention features controlling the coding mode by collectively taking the degree of deterioration due to error and degree of deterioration due to quantization at the coding time. The image quality deterioration estimation method or the coding mode determining method will now be described in connection with a more specific example.

Figure 2:
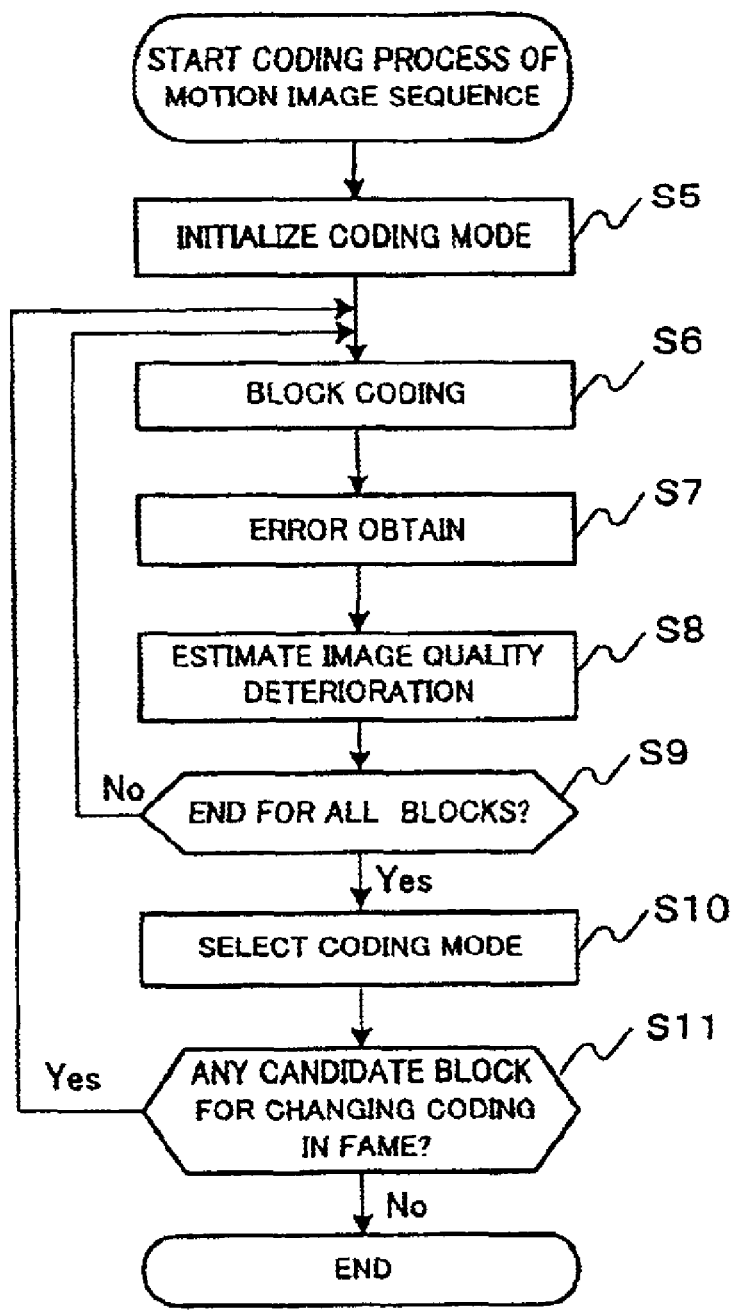
FIG. 2 is a flow chart showing the flow of processing in an embodiment of the present invention.

FIG. 2 is a flow chart showing the flow of processing in one embodiment of the present invention.

Referring to FIG. 2, at the time of the start of coding of an image frame, the coding mode is initialized to the inter-frame predictive coding for each block (step S5). The blocks are then coded block by block in the designated coding mode (step S6). The quantization error between decoded image obtained by decoding the coded data and the input image and the deterioration error as the error between decoded image obtained by decoding the coded data and the deterioration error as the error between deteriorated image in the case of assuming the error occurrence in the coded data and the input image are then computed for each block (step S7). After the steps S6 to S8 have been executed for all the frames in the image frame (step S9), the coding mode is selected such as to reduce the image deterioration degree (step S10). When a candidate block for changing the coding mode to the intra-frame coding, the sequence of the steps of the block coding up to the image quality deterioration degree estimation are executed for all the blocks in the image frame and then the step of selecting the coding mode is repeatedly executed. When no candidate block is found, an end is brought to the image frame coding (step S11).

Figure 3:
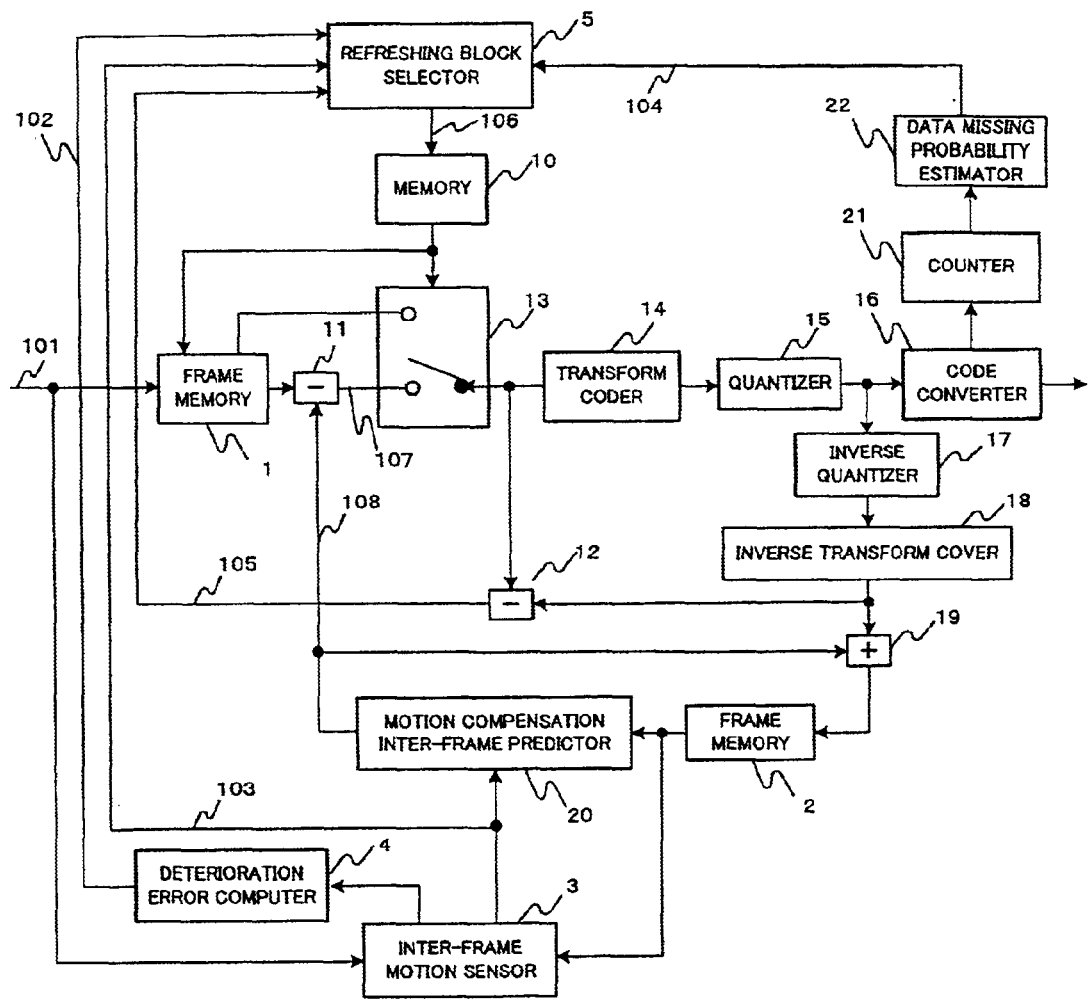
FIG. 3 is a block diagram showing an embodiment according to the present invention.

FIG. 3 is a block diagram showing an embodiment of the present invention. The flow of processing shown in FIG. 2 according to the present invention the embodiment of the present invention will now be described with reference to FIG. 3.

When input image 101 is inputted, the coding mode for all the blocks is set to the inter-frame predictive coding as initial value of the coding mode for each block in a pre-processing for the coding of each block. Then, motions between reference image and input image are detected. That is, an inter-frame motion sensor 3 detects inter-frame motions of the input image 101 with reference to reference image read out from the frame memory 2, and outputs motion vectors 103 representing the motion of a small block.

When the block coding mode is the intra-frame coding, a transform coder 14 subjects the input image stored in a frame memory 1 to orthogonal transform, and a quantizer 15 quantizes the post-transform signal. When the mode is the inter-frame coding, a motion compensation inter-frame predictor 20 computes predicted image 108 by executing motion compensation inter-frame prediction with reference to the reference image stored in a frame memory 2 and the motion vector 103. A subtracter 11 takes the difference between the input image stored in the frame memory 1 and the predicted image 108. A transform coder 14 subjects the resultant predicted error signal to orthogonal transform. A quantizer 15 quantizes the post-transform signal. A code converter 16 codes the quantized signal outputted from the quantizer 15 to generate coded data. An inverse quantizer 17 inversely quantizes the quantized signal. An inverse transform coder 18 subjects the inversely quantized signal to inverse transform. An adder 19 adds together the predicted image 108 and predicted error image obtained by the inverse transform coding to generate a reference image, and stores the generated reference image in the frame memory 2.

After the processing of the block coding, a subtracter 12 takes the difference between the signal to be inputted to the transform coder and the output signal from the inverse transform coder, and computes the quantization error for each block. A deterioration error computer 4 computes for each block a deterioration error with respect to the input signal in the case of missing of the data obtained by coding the input image due to error on the basis of the error between the reference image and the present frame obtained in the motion detection processing in the inter-frame motion detector 3. As this error, difference square sum, absolute difference sum or power in the consideration of man's sight characteristics is used.

A counter 21 monitors the coded data output of the code converter 16, and measures a section code amount as distance between a sync. code insertion position and block under attention. A data missing probability estimator 22 computes the probability 104 of missing of data due to an error in the block under attention of the basis of the measured code amount. The computation formula is given as $1-(1-\lambda)^L$ where L is the measured code amount, $\lambda$ is the probability of error occurrence in units of bits. This formula can be approximated by $\lambda*L$ when it is assumed that $\lambda$ is very small compared to $1(\lambda<<1)$.

A refreshing block selector 5 receives deterioration error 102, motion vector 103, data missing probability 104 due to error for each block and quantization error 105 as its inputs, and computes the image quality deterioration degree for each block. On the basis of this image quality deterioration degree, the refreshing block selector 5 selects the coding mode. A memory 10 stores the coding modes for all the blocks.

Figure 4:
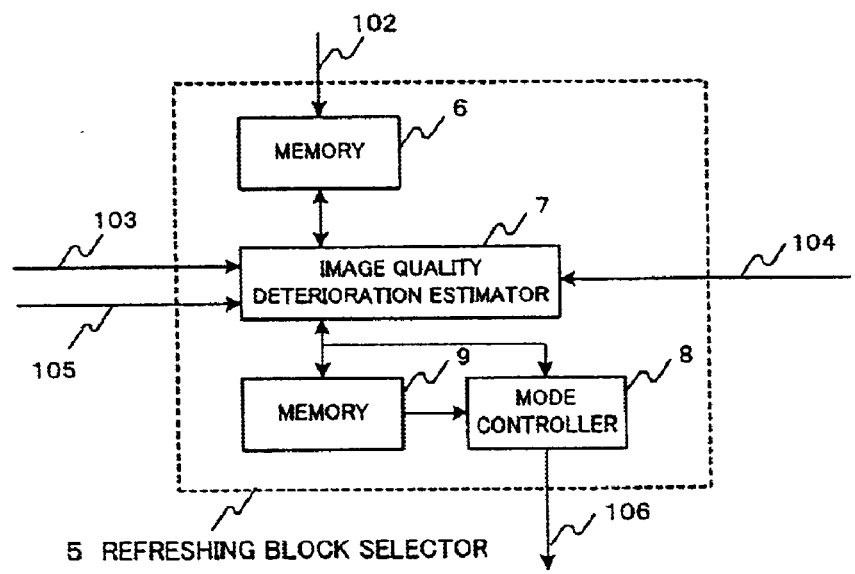
FIG. 4 is a block diagram showing the construction of the refreshing block selector 5 in the embodiment.

FIG. 4 is a block diagram showing the construction of the refreshing block selector 5. The refreshing block selector 5 includes a memory 6 for storing the deterioration errors 102 for all the blocks in the frame, an image quality deterioration estimator 7 for estimating the overall image quality deterioration degree taking both the image quality deterioration due to error occurrence and the image quality deterioration due to quantization into considerations with reference to the deterioration error stored in the memory 6, the motion vector 103, the data missing probability 104, the quantization error 105 and the image quality deterioration degree of the preceding frame stored in the memory 9, a memory 9 for storing the image quality deterioration degrees of each block in the preceding and present frames for all the blocks, a data mode controller 8 for determining the coding mode of the pertinent block by comparing the image quality deterioration degree updated by the image quality deterioration estimator 7 and the image quality deterioration degree stored in the memory 9.

The image quality deterioration degree assumes different values in dependence on whether the coding mode of the pertinent block is the intra-frame coding or the inter-frame predictive coding. Representing the expected value of the image quality deterioration in the case of missing of data due to an error by the product of the data missing probability 10 and the deterioration error stored in the memory 6, in the case of the intra-frame coding, the image quality deterioration degree is the sum of the image quality deterioration expected value and the quantization error 105. In the case the inter-frame predicted coding, it is necessary to add a propagation term based on the inter-frame image quality deterioration prediction in the reference frame to the sum of the product of the data missing probability 104 and the deterioration error stored in the memory 6 and the quantization error 105.

The propagation of the image quality deterioration will now be described with reference to FIG. 5.

Figure 5:
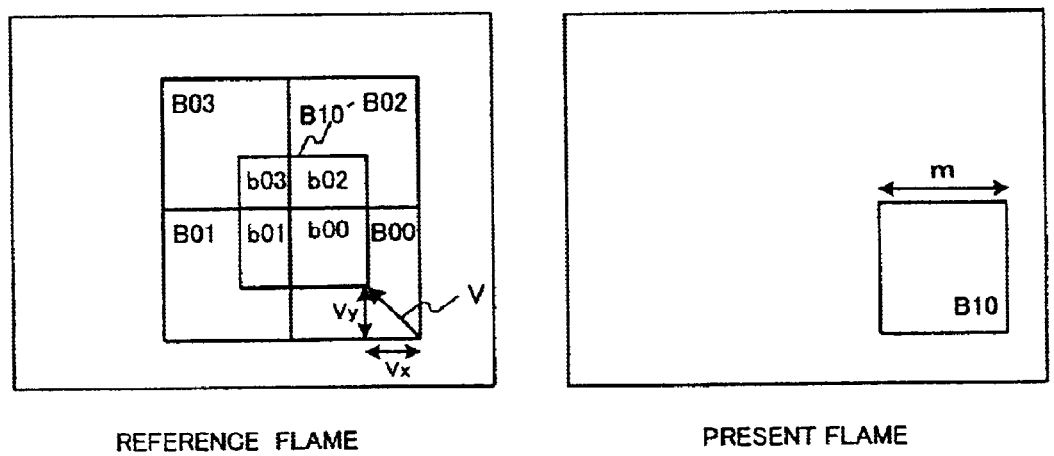
FIG. 5 shows the propagation of the image quality deterioration.

Referring to FIG. 5, with respect to pertinent block B10 in the present frame, a reference block of the reference frame in the motion compensation inter-frame prediction is designated by B10'. Designated by B00 to B03 are blocks occupying the reference frame and centrally including the block B10'. Designated by b00 to b03 are common parts of the blocks B00 to B03, respectively, and the block B10'. Designated by V is a motion vector of motion from the block B10. In the inter-frame predictive coding, the block B10 directly succeeds to the image quality deterioration in the block B10'. The value of the succeeded image quality deterioration is the sum of the image quality deterioration values of the blocks b00 to b03 as respective parts of the block B10'. These image quality deterioration degrees are approximated by multiplying the image quality deterioration degrees of the blocks B00 to B03 by the area ratios, respectively. The area ratio can be determined by the motion vector. The area ratio of the blocks b00 to B00 is expressed as $(m-Vx)*(m-Vy)/m*m$ where m is one side of the block and Vx and Vy are length projections of the block in horizontal and vertical axis directions, respectively. The area ratios of the blocks b01 to b03 can also be expressed likewise. As shown above, the term of the propagation deterioration from the reference block frame with the block B10 is expressed in value as an weighted sum obtained from the image quality deterioration degrees of the B00 to B03 stored in the memory 9 according to the motion vector 103.

When the image quality deterioration degree has been computed for all the blocks in the image frame, the blocks as subject of the intra-frame coding are selected. The measure of the selection is to minimize the sum of the image quality deterioration degrees of all the blocks. By switching the block coding mode from the inter-frame predictive coding to the intra-frame coding, the influence of the propagation of the deterioration from the preceding frame vanishes. In this case, however, the code amount is increased to increase the data missing probability, thus increasing the quantization error by the code amount control.

The selection may be done in either one of two different methods. One of the methods is to determine blocks for collective intra-frame coding according to the computed image quality deterioration degree. The intra-frame coding is set as the coding mode by selecting a predetermined number of blocks among blocks with greater image quality deterioration degrees than a predetermined threshold degree or in the order of greater image quality deterioration degrees. Thereafter, all the blocks in the present frame are coded in these coding modes. In this way, the present frame is coded.

The other method is to repeatedly execute the processing from the block coding to the image quality deterioration degree for all the blocks a plurality of times. Among all the blocks those of the inter-frame predictive coding as the coding mode are selected as desired. Then, the image quality deterioration degrees of these blocks are tentatively stored, and then the intra-frame coding is tentatively set as the coding mode. Then, the steps of the block coding, the error computation, the data missing probability estimation and the image quality deterioration degree estimation are executed again for all the image frame blocks, and then the updated image quality deterioration degree of the block under attention is compared with the tentatively stored image deterioration degree. When the updated image quality deterioration degree is reduced compared to the non-updated one, the coding mode of the block under attention is changed to the intra-frame coding, and a candidate block with the intra-frame coding newly set therefor is selected. This process is repeatedly executed. When the updated image quality deterioration degree is increased compared to the non-updated one, the coding mode of the block under attention is switched back to the inter-frame predictive coding, then a different block with the inter-frame predictive coding is set therefor as the coding mode, and the above operation is executed. When the image quality deterioration degree is increased by changing the coding mode for all the candidate blocks, the processing of the frame coding is ended.

In the above processing, a block with the inter-frame predictive coding set therefor as the coding mode is selected as designated as a candidate block for selecting the intra-frame coding therefor, and this operation is repeatedly executed to determine the coding mode such as to minimize the sum of the image quality deterioration degrees of all the blocks. However, it is possible to adopt a different method of selection as well, such as selecting blocks in the order of the greater image quality deterioration degrees or selecting a plurality of greatest image quality deterioration degree blocks.

Also, while in the above processing the overall image quality deterioration degree is estimated by simply adding together the expected deterioration in the present frame, the propagation of the deterioration from the preceding frame and the quantization error power, it is possible to appropriately change the weighting with respect to these parameters according to the image quality control at the time of the design. For example, the quantization error is not used as the image quality deterioration degree. In this case, the mode can be selected such as to always provide optimum resistance against error without taking the image quality in the case of obtaining normal decoding into considerations. As another example, the term of the propagation of the deterioration from the preceding frame are multiplied by a value greater than one, and the intra-frame coding is selected preferentially for blocks with greater degrees of propagation of the deterioration from the preceding frame. In this way, it is possible to suppress the retention of the deteriorated blocks for a plurality of frames.

Furthermore, while according to the present invention the quantization error 105 is computed by using the signal inputted to the transform coder 14 and the signal outputted to the inverse transform coder 18, it is also possible to estimate the quantization error on the basis of the quantization step used in the quantizer 15. For example, when quantizing a value in a range of a−Q/2, a+Q/2 to a, the mean square of the errors is expressed as $Q^2/12$.

A second embodiment of the present invention will now be described with reference to FIGS. 6 and 7.

Figure 6:
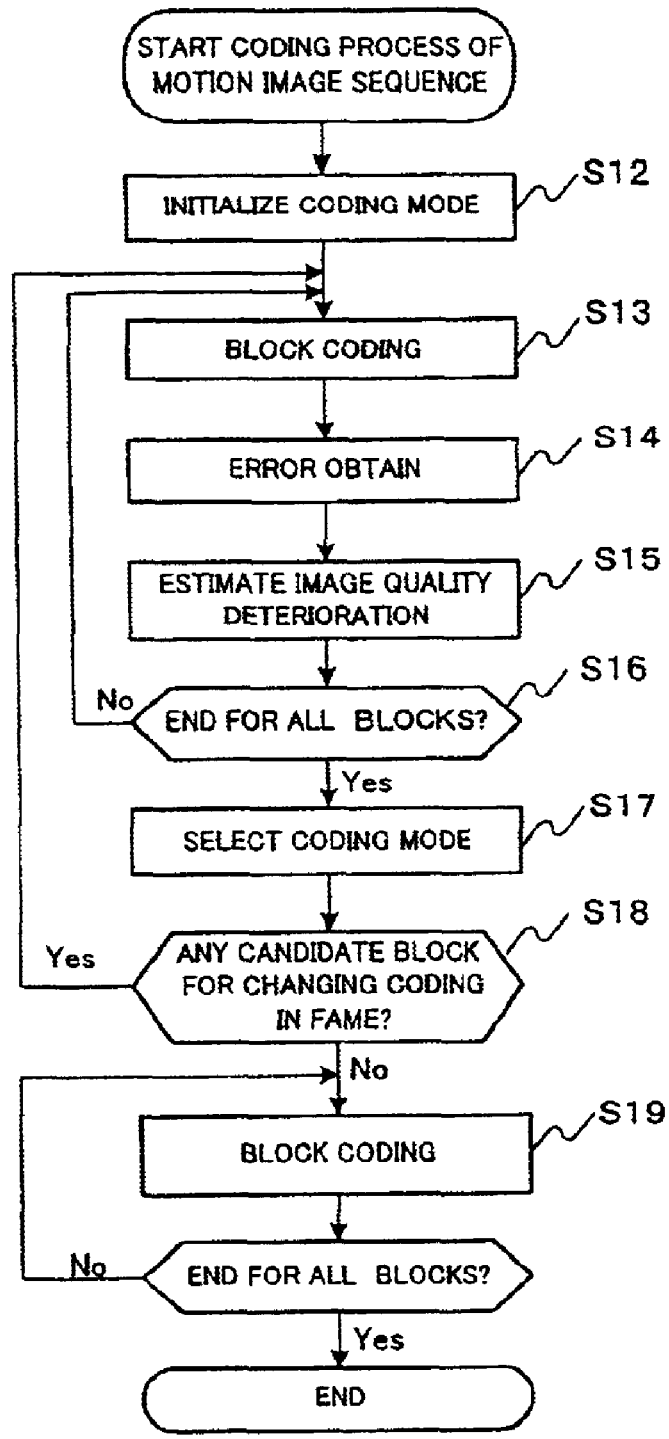
FIG. 6 is a flow chart showing the flow of processing in the second embodiment of the present invention.

FIG. 6 is a flow chart showing the flow of processing in the second embodiment of the present invention.

First, the inter-frame predictive coding is initially set as the coding mode for each block in the input image (step S12). The code amount is then estimated for each block (S13). The quantization error as the error between decoded image obtained by decoding coded data and the input image and the deterioration error between the deteriorated image in the case of assuming the error occurrence in the coded data and the input image, are then computed for each block (S14). On the basis of these two errors and the data missing probability, the overall image quality deterioration degree, i.e., the combination of the image quality degree deterioration in a certain error generation probability case and the image quality deterioration degree due to the quantization, is estimated (step S15). The above processing is executed for all the frames in the image frame (step S16), and then the coding mode is then selected such as to reduce the image quality deterioration degree (step S17). When a candidate block for setting the intra-frame coding therefor as the coding mode is found, a series of steps from the block code amount estimation to the image quality deterioration degree estimation and then selecting the coding mode afresh, is repeatedly executed. When no candidate block is found, an end is brought to the coding mode selection (step S18). Then, all the blocks in the frame are coded in the coding mode at that time (step S19), and an end is brought to the processing of the frame coding.

Figure 7:
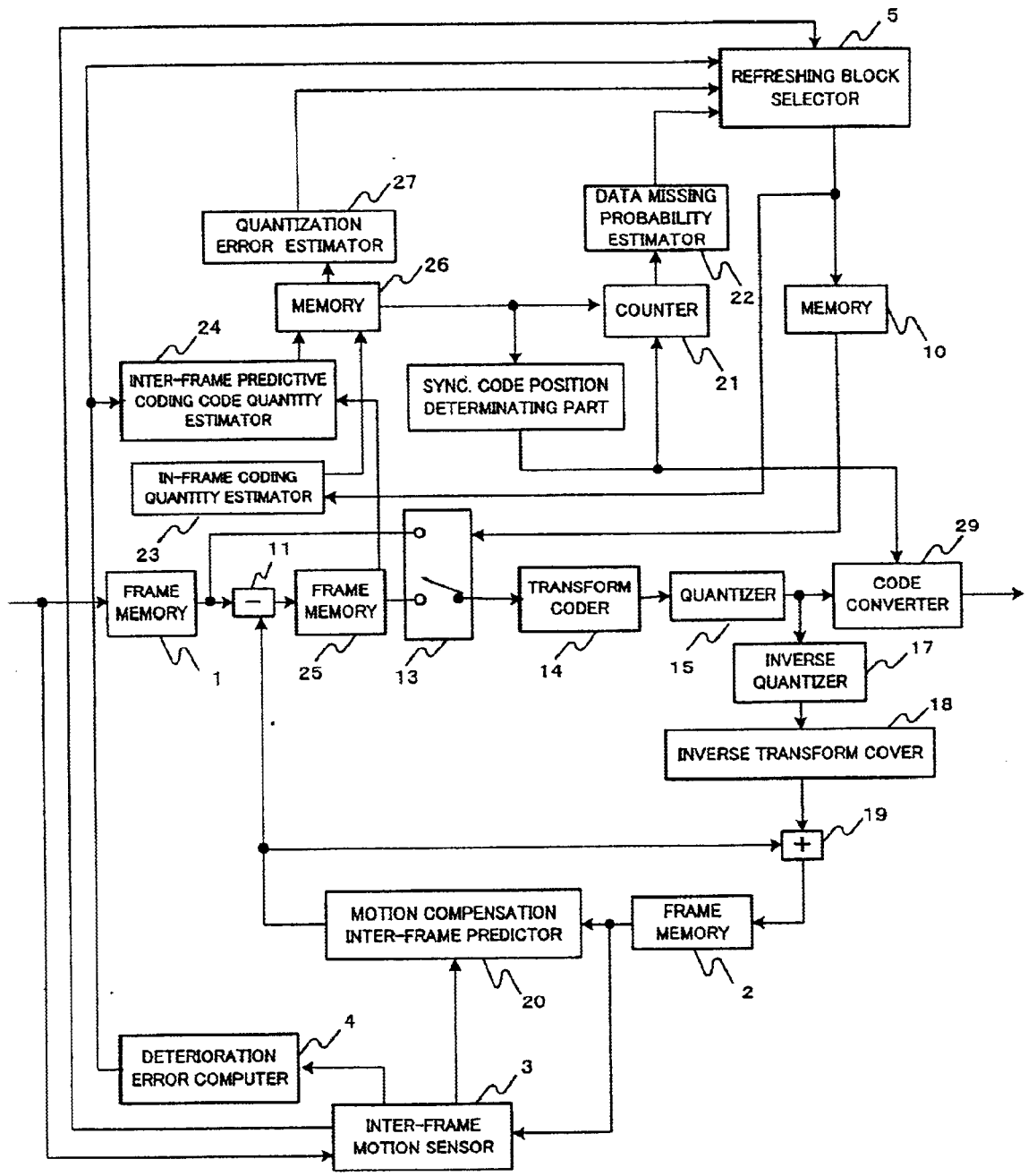
FIG. 7 is a block diagram showing the second embodiment of the present invention.
Figure 8:
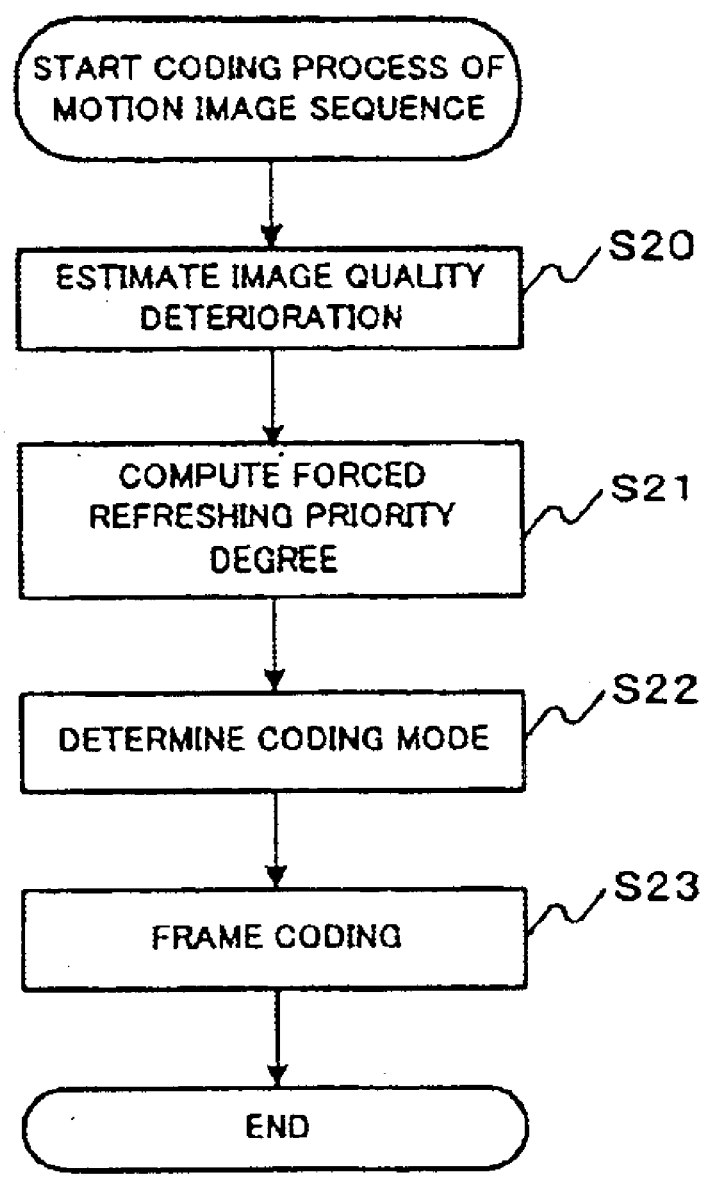
FIG. 8 is a flow chart showing the processing flow of a motion image coding method adopting the prior art.
Figure 9:
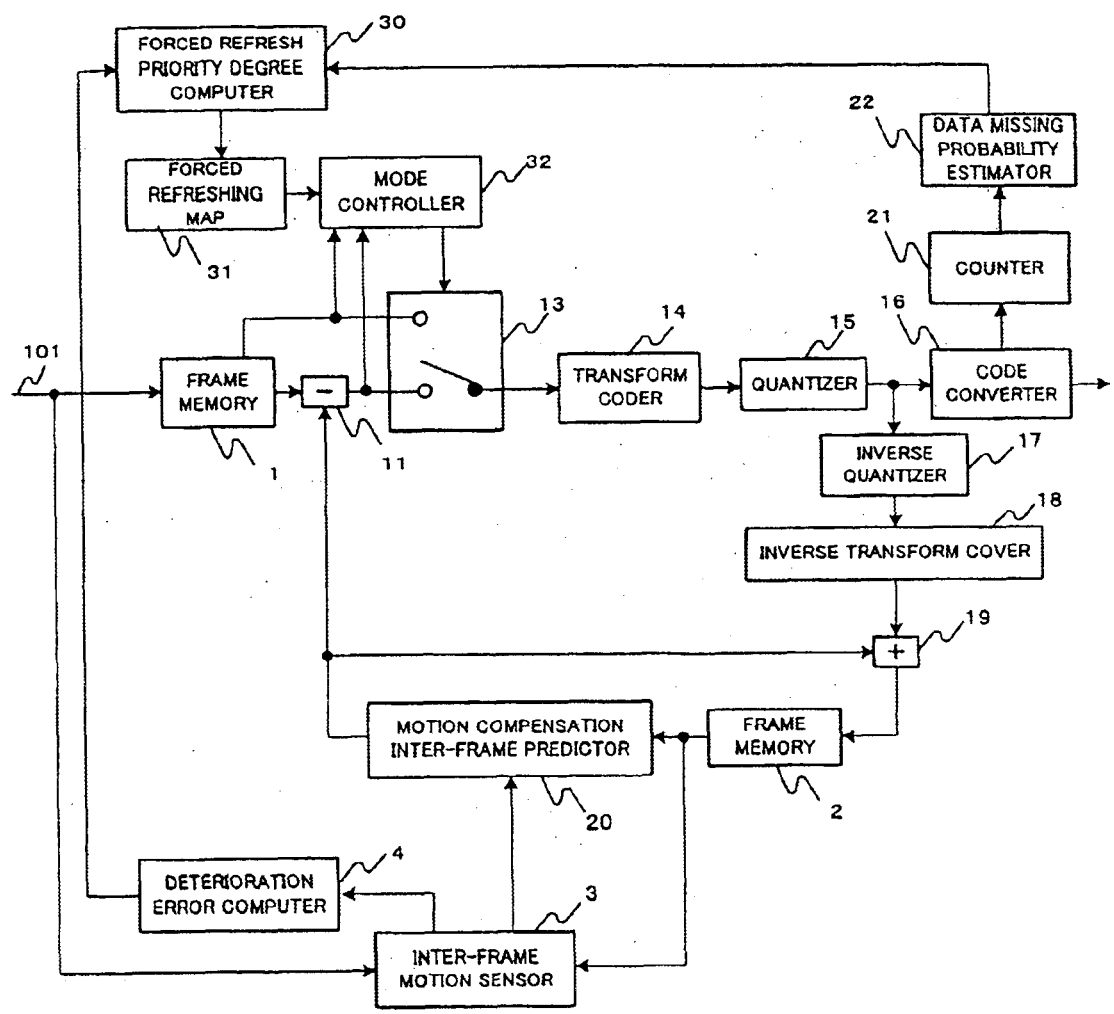
FIG. 9 is a block diagram showing a prior art motion image coding system.
Figure 10:
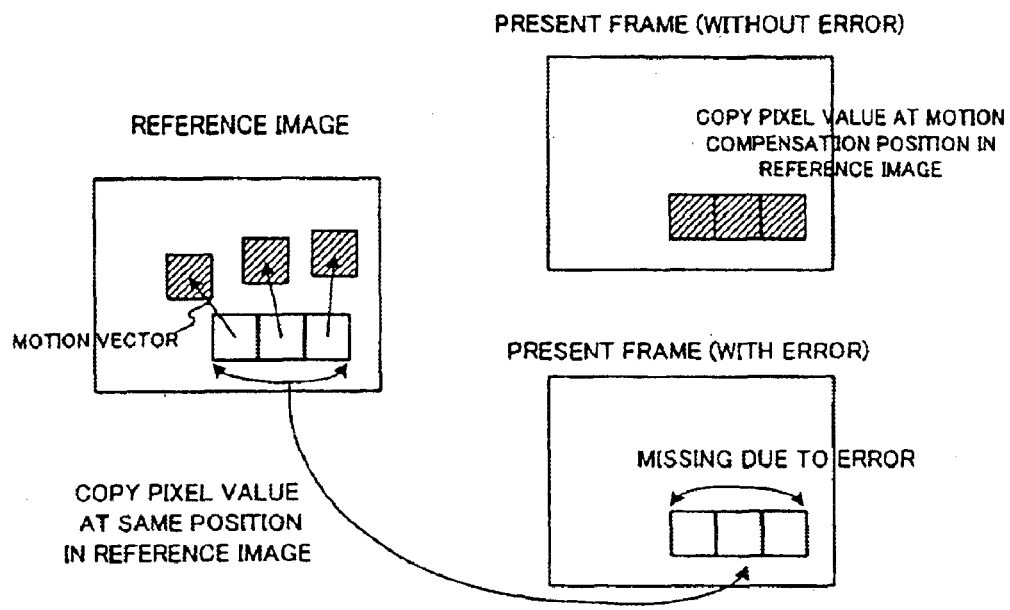
FIG. 10 is a view for describing error at the time of deterioration.
Figure 11:
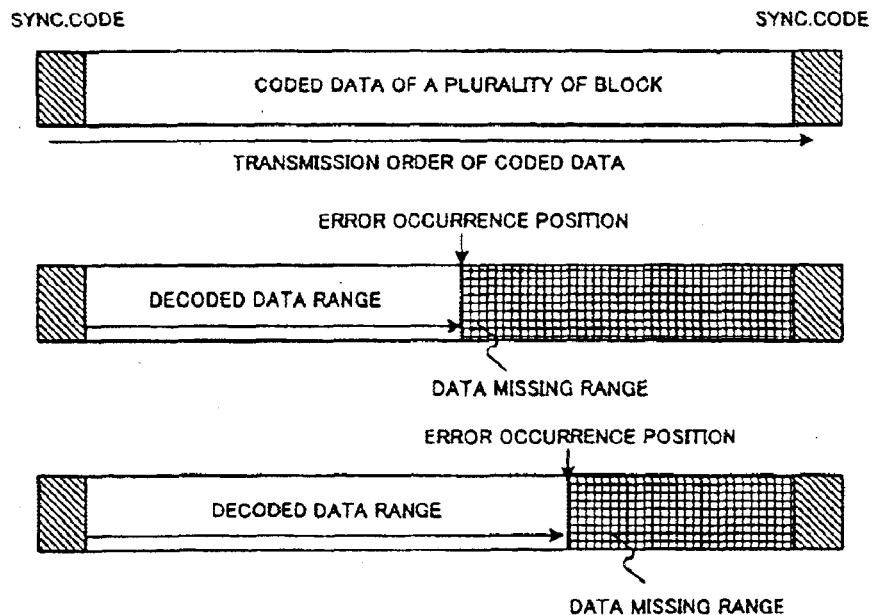
FIG. 11 is a view for describing data missing due to the error.

FIG. 7 is a block diagram showing a second embodiment of the present invention. The flow of processing in the second embodiment will now be described in greater details with reference to FIG. 7.

Referring to FIG. 7, an example of construction for realizing this embodiment of the image sequence coding method comprises, in addition to the construction example shown in FIG. 3 for realizing the image sequence coding in the first embodiment, a intra-frame coding code amount estimator 23, an inter-frame predictive coding code amount estimator 24, a frame memory 25, a memory 26, a quantization error estimator 27 and a sync. code position determining part 28.

When the motion detection with respect to all the blocks, the deterioration error computation, and the initial setting of the coding mode have been ended after the start of the image frame coding, the code quantities of the blocks are estimated block by block.

When the intra-frame coding code amount estimator 23 receives the input image, it estimates the code quantities of the pertinent blocks, and stores these data in the memory 26. The memory 26 stores the estimated code quantities of all the blocks in the frame. The code amount may be estimated by such method as computing the inter-block signal variation and computing the code amount according thereto. It is also possible, like the actual coding, to execute transform coding and quantization and then compute data amount.

The inter-frame predictive coding code amount estimator 24 estimates the code quantities of pertinent blocks by receiving at least either a predicted error signal obtained by the inter-frame predictive coding or predicted error power obtained at the time of the inter-frame motion detection processing, and stores the estimated code amount data in the memory 26. The frame memory 25 serves to store the predicted error signal for the code amount estimation. When estimating code quantities by using the sole predicted error power, the frame memory 25 is unnecessary.

The quantization error estimator 27 executes quantization step estimation for each block by using the estimated value of code amount of each block stored in the memory 26, and computes the quantization error on the basis of the estimation. For the quantization step estimation processing, a system like the code amount control system used for the usual coding is used.

The sync. code position determining part 28 determines the sync. code position for the computation of the data missing probability by using the estimated value of code amount stored for each block in the memory 26. The counter 20 counts the distance from the determined sync. code position to the pertinent block as the code amount. The sync. code position data is fed out from the sync. code position determining part 28 is fed out to the code converter 29 or it is reflected to the actual coding as well.

The refreshing block selector 5 selects the coding mode by computing the image quality deterioration degrees of all the blocks on the basis of the quantization error output of the deterioration error computer 4, the motion vector output of the motion compensation inter-frame predictor, the quantization error output of the quantization error estimator and the data missing probability output of the data missing probability estimator. For the blocks with the intra-frame coding set therefor as the coding mode, the refreshing block selector 5 executes the code amount estimation afresh, and on the basis of this it estimates the quantization errors and the data missing probabilities of all the blocks. After the coding mode has been determined for each block in the same manner as in the first embodiment, all the blocks in the frame are coded.

In the first embodiment, the processing of comparing the image quality deterioration degree after the coding of all the blocks is done every time a block for the intra-frame coding is determined in the case where both the intra-frame coding and the inter-frame predictive coding are the coding modes for the candidate blocks. Therefore, enormous computational efforts are necessary. In the second embodiment, prior to the actual coding processing the coding mode is determined for all the blocks by predicting the code quantities of each block in both cases of the intra-frame coding and the inter-frame predictive coding. Thus, in the second embodiment the computational efforts are greatly reduced.

While two embodiments of the present invention have been described, the present invention is also applicable to other image sequence coding methods, in which blocks for intra-frame coding are selected by using the image quality deterioration degree expressed as the linear sum of the quantization error and the expected value of deterioration.

As has been described in the foregoing, the image sequence coding system according to the present invention permits effective forced intra-frame coding of efficient coding by preferentially taking the quantization error generated as distortion at the time of the usual coding or the propagation of the deterioration from a past frame as the image quality deterioration degree of each block into considerations as a measure of forced intra-frame coding. Thus, it is possible to obtain an effect that, compared to the prior art method, the image quality when no error is generated is not pronouncedly deteriorated.

In addition, according to the present invention forced intra-frame coding is done preferentially for the blocks, which are estimated to be deteriorated in image quality, by estimating the degree of image quality deterioration occurring due to transmission error for each block. In the prior art method, the threshold setting and the parameter adjustment are done experimentally, without taking such image sequence properties as the number of blocks to be subjected to the forced intra-frame coding into considerations. According to the present invention, it is possible to always realize suitable forced intra-frame coding.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An image sequence coding method for coding input image to coded data by adaptively selectively using either intra-frame coding or inter-frame predictive coding in units of blocks as coding units, comprising:

an error computing step of computing, in frame-by-frame coding of the input image, the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors;

a block coding mode control step of block-by-block controlling the coding mode to either the intra-frame coding or the inter-frame predictive coding according to the image quality deterioration degree; and a frame coding step of coding all the blocks in the pertinent frame in the controlled coding modes.

2. An image sequence coding method for coding input image to coded data by adaptively selectively using either intra-frame coding or inter-frame predictive coding in units of blocks as coding units, comprising:

a coding mode initializing step of presetting, in the frame-by-frame coding of the input image, the coding mode to the inter-frame predictive coding for all the blocks in the frame;

a block coding step of executing block-by-block coding according to the preset coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree;

wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought;

3. An image sequence coding method for coding input image to coded data by adaptively selectively using either intra-frame coding or inter-frame predictive coding in units of blocks as coding units, comprising:

a coding mode initializing step of presetting, in the frame-by-frame coding of the input image, the coding mode to the inter-frame predictive coding for all the blocks in the frame;

a block coding step of executing block-by-block coding according to the preset coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree;

wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image and the image quality deterioration degree estimated in the image quality deterioration degree estimating step, being expressed as the linear sum of the expected value of the degree of image quality deterioration due to transmission error in the coded data and the quantization error.

4. The image sequence coding method according to claim 3, wherein:

in the quantization error computing step the quantization error is estimated from quantization steps obtained for each block in the block coding step.

5. The image sequence coding method according to claim 3, wherein in the deterioration error computing step the deterioration error is estimated by using the decoded image of the preceding frame as deteriorated image.

6. An image sequence coding method for coding input image to coded data by adaptively selectively using either intra-frame coding or inter-frame predictive coding in units of blocks as coding units, comprising:

a coding mode initializing step of presetting, in the frame-by-frame coding of the input image, the coding mode to the inter-frame predictive coding for all the blocks in the frame;

a block coding step of executing block-by-block coding according to the preset coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors; and a block coding mode control step for block-by-block controlling the coding mode to either the inter-frame predictive coding or the intra-frame coding according to the image quality deterioration degree;

wherein after the execution of the block coding step, the error computation step and the image quality deterioration estimating step, the block coding mode control step is executed such that when a candidate block with the intra-frame coding to be selected therefor as the coding mode is found, a step sequence of the block coding step, the error computing step and the image quality deterioration estimating step, these steps being executed for all the blocks in the frame, and then executing the block coding mode control step afresh, is repeatedly executed after the coding mode of the pertinent blocks to the intra-frame coding, and that when no candidate block with the intra-frame coding to be selected therefor as the coding mode, an end is brought.

the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, the image quality deterioration degree estimated in the image quality deterioration degree estimating step, being expressed as the linear sum of the expected value of the degree of image quality deterioration due to transmission error in the coded data and the quantization error, the image quality deterioration degree estimating step including a data missing probability estimating step of block-by-block counting the distance from the position of a sync. code inserted in the coded data and estimating the data missing probability, i.e., the probability of missing, during transmission, of the coded data of the block under attention, and the expected value of deterioration in the case when the block under attention is a intra-frame coded block being computed as the product of the deterioration error and the data missing probability, and the expected value of deterioration in the case when the block under attention is an inter-frame predictive coded block being made to the sum of the product of the deterioration error and the data missing probability and the deterioration propagation term as expected value of deterioration of an area of the reference frame referred to in a motion compensation processing in the inter-frame predictive coding.

7. The image sequence coding method according to claim 6, wherein:

the deterioration propagation term is computed as a weighted mean of the expected values of deterioration of a plurality of blocks contained in the area of the reference frame referred to as in the motion compensation processing.

8. The image sequence coding method according to claim 6, wherein:

in the image quality deterioration degree estimating step, the expected value of deterioration in the case when the block under attention is an inter-frame predictive coded block, is set to the sum of the product of the deterioration error and the data missing probability and a value obtained by multiplying a predetermined proportionality constant by the deterioration propagation term.

9. The image sequence coding method according to claim 2, 3 or 6, wherein:

in the block coding mode control step, the image quality deterioration degrees of all the blocks in the frame are compared to a predetermined threshold value, and the intra-frame coding is selected as the coding mode of blocks having image quality deterioration degrees greater than the threshold value.

10. The image sequence coding method according to claim 2, 3 or 6, wherein:

in the block coding mode control step, a predetermined number of blocks among the blocks of the image frame are selected in the order of greater image quality deterioration degrees, and the intra-frame coding is selected as the coding mode of the selected blocks.

11. The image sequence coding method according to claim 2, 3 or 6, wherein the block coding mode control step includes:

a refreshing block candidate selecting step of selecting given blocks with the inter-frame predictive coding set therefor among all the blocks in the image frame and tentatively setting the intra-frame coding as the coding mode of the selected blocks; and a block coding mode judging step, in which the image quality deterioration degrees of the blocks selected in the refreshing block candidate selecting step are tentatively stored and, after the execution of the block coding step, the error computing step and the image quality deterioration estimating step for all the blocks in the image frame again, when it is found that the updated image quality deterioration degree of a block under attention is reduced compared to the tentatively stored image quality deterioration degree, the intra-frame coding is selected as the coding mode of the block under attention, and the refreshing block candidate selecting step is executed afresh, when it is found that the image quality deterioration degree of the block is increased compared to the tentatively stored image quality deterioration degree, the inter-frame predictive coding is set again as the coding mode of the block under attention, and the refreshing block candidate selecting step is executed afresh, and when it is found that the image quality deterioration degrees of all the blocks selectable in the refreshing block candidate selecting step are increased by selecting the intra-frame coding as the coding mode, an end is brought.

12. An image sequence coding method for coding input image to coded data by adaptively selectively using either intra-frame coding or inter-frame predictive coding in units of blocks as coding units, comprising:

a coding mode initializing step of presetting, for frame-by-frame coding of the input image, the inter-frame predictive coding for all the blocks in the image frame as the coding mode, which is preset block by block to either the intra-frame coding or the inter-frame predictive coding;

a block code amount estimating step of estimating the code amount of each block according to the coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors;

a block coding step of executing block-by-block coding according to the coding mode;

wherein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time.

13. An image sequence coding method for coding input image to coded data by adaptively selectively using either intra-frame coding or inter-frame predictive coding in units of blocks as coding units, comprising:

a coding mode initializing step of presetting, for frame-by-frame coding of the input image, the inter-frame predictive coding for all the blocks in the image frame as the coding mode, which is preset block by block to either the intra-frame coding or the inter-frame predictive coding;

a block code amount estimating step of estimating the code amount of each block according to the coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors;

a block coding step of executing block-by-block coding according to the coding mode;

wherein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, and the image quality deterioration degree estimated in the image quality deterioration degree estimating step, being expressed as the linear sum of the expected value of the degree of image quality deterioration due to transmission error in the coded data and the quantization error.

14. The image sequence coding method according to claim 13, wherein the block code amount estimating step includes a code amount control step of controlling the quantization steps of each block such that the sum of the code quantities of all the blocks in the image frame is settled in the neighborhood of a predetermined desired code amount, and the quantization error computing step estimates the quantization error on the basis of the quantization steps of each block obtained in the block code amount estimating step.

15. The image sequence coding method according to claim 13, wherein in the deterioration error computing step the deterioration error is estimated by using the decoded image of the preceding frame as deteriorated image.

16. An image sequence coding method for coding input image to coded data by adaptively selectively using either intra-frame coding or inter-frame predictive coding in units of blocks as coding units, comprising:

a coding mode initializing step of presetting, for frame-by-frame coding of the input image, the inter-frame predictive coding for all the blocks in the image frame as the coding mode, which is preset block by block to either the intra-frame coding or the inter-frame predictive coding;

a block code amount estimating step of estimating the code amount of each block according to the coding mode;

an error computing step of block-by-block computing the error between decoded image obtained by decoding the coded data and the input image and the error between deteriorated image in the case of assuming the missing of data and the input image;

an image quality deterioration degree estimating step of block-by-block estimating the image quality deterioration degree representing the image quality deterioration degree in the case of occurrence of error in the coded data with a certain probability on the basis of both the errors;

a block coding step of executing block-by-block coding according to the coding mode;

wherein, after the execution of the block code amount estimating step, the error computing step and the image quality deterioration estimating step for all the blocks, the block coding mode control step is executed such that, when it is found that a candidate block for selecting the intra-frame coding as the coding mode is present, the intra-frame coding is selected as the coding mode of the pertinent block, and a step sequence of the block code amount estimating step, the error computing step and the image quality deterioration estimating step, these steps being executed for all the blocks, and the execution of the block coding mode control step afresh, is repeatedly executed, and when it is found that no candidate block for selecting the intra-frame coding as the coding mode is present, the block coding step is executed for all the blocks in the frame in the coding mode of each block time, the error computing step including a quantization error computing step of block-by-block computing the quantization error as the error between the decoded image and the input image, and a deterioration error computing step of block-by-block computing the deterioration error as the error between the deteriorated image in the data missing assuming case and the input image, and the image quality deterioration degree estimated in the image quality deterioration degree estimating step, being expressed as the linear sum of the expected value of the degree of image quality deterioration due to transmission error in the coded data and the quantization error; and the image quality deterioration degree estimating step including a sync. code position determining step for determining the position sync. code inserted in the coded data on the basis of the predicted code amount of each block obtained in the block code amount estimating step, and a data missing probability estimating step of counting the distance from the sync. code for each block and estimating the probability of the missing of the coded data of the block under attention during transmission from the count thus obtained, the expected value of deterioration in the case when the block under attention is a intra-frame coded block being computed as the product of the deterioration error and the data missing probability, and the expected value of deterioration in the case when the block under attention is an inter-frame predictive coded block being made to the sum of the product of the deterioration error and the data missing probability and the deterioration propagation term as expected value of deterioration of an area of the reference frame referred to in a motion compensation processing in the inter-frame predictive coding.

17. The image sequence coding method according to claim 16, wherein:

the deterioration propagation term is computed as a weighted mean of the expected values of deterioration of a plurality of blocks contained in the area of the reference frame referred to as in the motion compensation processing.

18. The image sequence coding method according to claim 16, wherein:

in the image quality deterioration degree estimating step, the expected value of deterioration in the case when the block under attention is an inter-frame predictive coded block, is set to the sum of the product of the deterioration error and the data missing probability and a value obtained by multiplying a predetermined proportionality constant by the deterioration propagation term.

19. The image sequence coding method according to claim 12, 13 or 16, wherein:

in the block coding mode control step, the image quality deterioration degrees of all the blocks in the frame are compared to a predetermined threshold value, and the intra-frame coding is selected as the coding mode of blocks having image quality deterioration degrees greater than the threshold value.

20. The image sequence coding method according to claim 12, 13 or 16, wherein:

in the block coding mode control step, a predetermined number of blocks among the blocks of the image frame are selected in the order of greater image quality deterioration degrees, and the intra-frame coding is selected as the coding mode of the selected blocks.

21. The image sequence coding method according to claim 12 13 or 16, wherein the block coding mode control step includes:

a refreshing block candidate selecting step of selecting given blocks with the inter-frame predictive coding set therefor among all the blocks in the image frame and tentatively setting the intra-frame coding as the coding mode of the selected blocks; and a block coding mode judging step, in which the image quality deterioration degrees of the blocks selected in the refreshing block candidate selecting step are tentatively stored and, after the execution of the block coding step, the error computing step and the image quality deterioration estimating step for all the blocks in the image frame again, when it is found that the updated image quality deterioration degree of a block under attention is reduced compared to the tentatively stored image quality deterioration degree, the intra-frame coding is selected as the coding mode of the block under attention, and the refreshing block candidate selecting step is executed afresh, when it is found that the image quality deterioration degree of the block is increased compared to the tentatively stored image quality deterioration degree, the inter-frame predictive coding is set again as the coding mode of the block under attention, and the refreshing block candidate selecting step is executed afresh, and when it is found that the image quality deterioration degrees of all the blocks selectable in the refreshing block candidate selecting step are increased by selecting the intra-frame coding as the coding mode, an end is brought.

22. The image sequence coding method according to claim 12, 13 or 16, wherein in the block code amount estimating step:

when the coding mode of the block under attention is the intra-frame coding, the input signal is subjected to transform coding and quantization, entropy is computed with respect to the codes after the quantization; and when the coding mode of the block under attention is the inter-frame predictive coding, the code amount estimation is done by transform coding and quantizing the predicted error signal and computing entropy with respect to the codes after the quantization.

23. The image sequence coding method according to claim 12, 13 or 16, wherein the block code amount estimating step is executed such that:

when the coding mode of the block under attention is the intra-frame coding, the code amount estimation is done with respect to the input signal on the basis of the variation thereof; and when the coding mode of the block under attention is the inter-frame predictive coding, the code amount estimation is done with respect to the predicted error signal on the basis of the variation thereof.

24. The image sequence coding method according to claim 12, 13 or 16, wherein in the block code amount estimating step:

when the coding mode of the block under attention is the inter-frame predictive coding, the code amount estimation is done on the basis of the error between predicted image after motion compensation obtained in the inter-frame motion detection and the input image.

* * * * *